United States Patent
Mandal et al.

(10) Patent No.: US 7,159,015 B2
(45) Date of Patent: Jan. 2, 2007

(54) METHOD AND APPARATUS FOR MANAGING CONFIGURATION INFORMATION IN A DISTRIBUTED COMPUTER SYSTEM

(75) Inventors: Chhandomay Mandal, Nashua, NH (US); Mark J. Musante, Westford, MA (US); Peter J. Wagener, Somerville, MA (US); Roberta A. Pokigo, Billerica, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 947 days.

(21) Appl. No.: 10/012,150

(22) Filed: Nov. 16, 2001

(65) Prior Publication Data

US 2003/0105840 A1 Jun. 5, 2003

(51) Int. Cl.
*G06E 15/177* (2006.01)
(52) U.S. Cl. .................. 709/220; 709/212; 709/223
(58) Field of Classification Search .............. 709/220, 709/223, 230, 212
See application file for complete search history.

(56) References Cited

U.S. PATENT DOCUMENTS

| | | | |
|---|---|---|---|
| 5,794,013 A | 8/1998 | McBrearty | |
| 6,002,085 A | 12/1999 | Utsumi et al. | |
| 6,058,401 A | 5/2000 | Stamos et al. | |
| 6,205,415 B1 | 3/2001 | Butts et al. | |
| 6,223,224 B1* | 4/2001 | Bodin | 709/236 |
| 6,269,373 B1 | 7/2001 | Apte et al. | |
| 6,298,478 B1 | 10/2001 | Nally et al. | |
| 6,332,163 B1 | 12/2001 | Bowman-Amulah | |
| 6,442,541 B1 | 8/2002 | Clark et al. | |
| 6,453,326 B1 | 9/2002 | Parham et al. | |
| 6,457,065 B1 | 9/2002 | Rich et al. | |
| 6,571,232 B1 | 5/2003 | Goldberg et al. | |
| 6,625,613 B1 | 9/2003 | Thompson | |
| 6,629,128 B1 | 9/2003 | Glass | |
| 6,704,805 B1* | 3/2004 | Acker et al. | 719/315 |
| 6,718,372 B1* | 4/2004 | Bober | 709/217 |
| 6,728,788 B1 | 4/2004 | Ainsworth et al. | |
| 6,757,708 B1 | 6/2004 | Craig et al. | |
| 6,772,178 B1 | 8/2004 | Mandal et al. | |
| 2002/0188591 A1* | 12/2002 | Santosuosso | 707/1 |
| 2003/0014432 A1 | 1/2003 | Teloh et al. | |
| 2003/0014433 A1 | 1/2003 | Teloh et al. | |
| 2003/0033327 A1 | 2/2003 | Mandal et al. | |
| 2003/0056028 A1* | 3/2003 | Underwood et al. | 709/328 |

(Continued)

FOREIGN PATENT DOCUMENTS

EP 0 957 437 * 11/1999

OTHER PUBLICATIONS

Anonymous, "Core Plans First Quarter Release of T27 and UTS Java Emulators", Unisys World, Jan. 2000, 21, p. 1-2.

(Continued)

*Primary Examiner*—Zarni Maung
*Assistant Examiner*—Nghi Tran

(57) ABSTRACT

A configuration manager federated bean is provided for each host computer in the three-tiered management system. The configuration manager federated bean for a host computer is contacted by federated beans that manage each of the data services when a data service starts and stops using a data storage volume associated with the host computer. The configuration manager bean maintains persistent configuration information for each data service. In one embodiment, configuration manager beans can operate in a clustered environment where several beans store configuration information in a single storage area. Each of the beans implements an arbitration protocol so that only one bean writes to the storage area at any given time.

14 Claims, 8 Drawing Sheets

U.S. PATENT DOCUMENTS

| | | |
|---|---|---|
| 2003/0061399 A1 | 3/2003 | Wagener et al. |
| 2003/0074446 A1 | 4/2003 | Musante et al. |
| 2003/0084116 A1 | 5/2003 | Musante et al. |
| 2003/0084198 A1 | 5/2003 | Mandal et al. |
| 2003/0088713 A1 | 5/2003 | Mandal et al. |
| 2003/0105840 A1 | 6/2003 | Mandel et al. |

OTHER PUBLICATIONS

Bhide, et al., "Implicit Replication in a Network File Server", IEEE, Unknown, 85-90.

Cai, et al., "SNDR: A New Medium Access Control For Multi-Channel Ad Hoc Networks", IEEE, Unknown, 966-971.

Kyeongho, et al., "Scheduling of Storage and Cache Servers For Replicated Multimedia Data", IEEE, 1997, 484-487.

Madan, et al., "A Distributed Real Time Database For Heterogeneous Computer Control Systems", IEEE, 1995, 435-440.

Makpangou, et al., "Replicated Directory Service For Weakly Consistent Distributed Caches", ACN, Unknown, 1-9.

Monson-Haefel, "Enterprise JavaBeans, 2nd Edition", Mar. 2000, 38-39, O'Reilly.

Pu, et al., "Replica Control in Distributed Systems,", ACM, 1991, 377-386.

Srnin, "An Architecture For Extended Abstract Dat Flow", IEEE, 1981, 303-325.

Thomas, "Enterprise JavaBeans Technology, Server Component Model For the Java Platform", Patricia Seybold Group, Dec. 1998, 1-24.

* cited by examiner

METHOD AND APPARATUS FOR MANAGING CONFIGURATION INFORMATION IN A DISTRIBUTED COMPUTER SYSTEM

FIELD OF THE INVENTION

This invention relates to data service configuration information, including the users of data volumes and the type of use and to methods and apparatus for storing such information and for persisting such information.

BACKGROUND OF THE INVENTION

In a distributed computer system it is convenient to have distributed management capability for data services such as data imaging, networked data replication and caching services. However, these services are typically implemented by low-level kernel routines running on each machine in the distributed system. One method of accomplishing such distributed management capability is to use a three-tiered data services management system. The lowest tier comprises management facade software running on each machine that converts a platform-dependent interface written with the low-level kernel routines to platform-independent method calls. The middle tier is a set of federated Java beans that communicate with the management facades and with the upper tier of the system. The upper tier of the inventive system comprises presentation programs that can be directly manipulated by management personnel to view and control the system. The federated beans allow managers located in one node of a multi-node network to locate and control data services running in other nodes.

Since the management system is distributed and multiple data services can be using the same data storage volumes, it can be difficult to determine which data service is using a given volume and how the data service is using the volume. Conflicts over the use of resources, such as data storage devices, can arise for a number of reasons. For example, in a multi-node system, managers in different nodes may attempt to use the same storage devices for different, conflicting purposes. Alternatively, in a clustered system, in which several host processors share the same storage device, managers in different host systems may also be in conflict over the common storage devices.

Further, it may also be necessary to persist configuration information so that the system can be restarted correctly in the case of power outages or device failures.

SUMMARY OF THE INVENTION

In accordance with the principles of the invention, a configuration manager federated bean is provided for each host computer in the three-tiered management system. The configuration manager federated bean for a host computer is contacted by federated beans that manage each of the data services when a data service starts and stops using a data storage volume associated with the host computer. The configuration manager bean maintains persistent configuration information for each of the data services.

In accordance with one embodiment, the data services can access the configuration information during the host system boot process and before file systems are mounted and management software can obtain the same information at a later time in a consistent manner.

In accordance with another embodiment, the configuration information is stored in such a manner that the information never is corrupted by multiple writes from different management software pieces.

In accordance with still another embodiment, the configuration information is stored in a human readable file such that the information can be used for disaster recovery.

In accordance with yet another embodiment, configuration manager beans can operate in a clustered environment where several beans store configuration information in a single storage area. Each of the beans implements an arbitration protocol so that only one bean writes to the storage area at any given time. In this embodiment, the beans communicate over a network to determine which of the beans will write to the storage area.

BRIEF DESCRIPTION OF THE DRAWINGS

The above and further advantages of the invention may be better understood by referring to the following description in conjunction with the accompanying drawings in which.

DETAILED DESCRIPTION

A data services configuration management system constructed in accordance with the principles of the invention operates in a data services system that comprises three layers or tiers. The first, or upper, tier is a presentation layer with which a manager interacts at a single host location. The upper tier, in turn, interacts with the middle tier comprised of a plurality of federated beans, each of which performs specific tasks in the system. The federated beans can communicate with each other both in the same host and in other hosts via a network connecting the hosts. Some of the beans can communicate with the lowest tier that comprises the aforementioned kernel modules that actually perform the data services. In this manner an entire data services system can be configured and managed from a single location.

Figure 1:
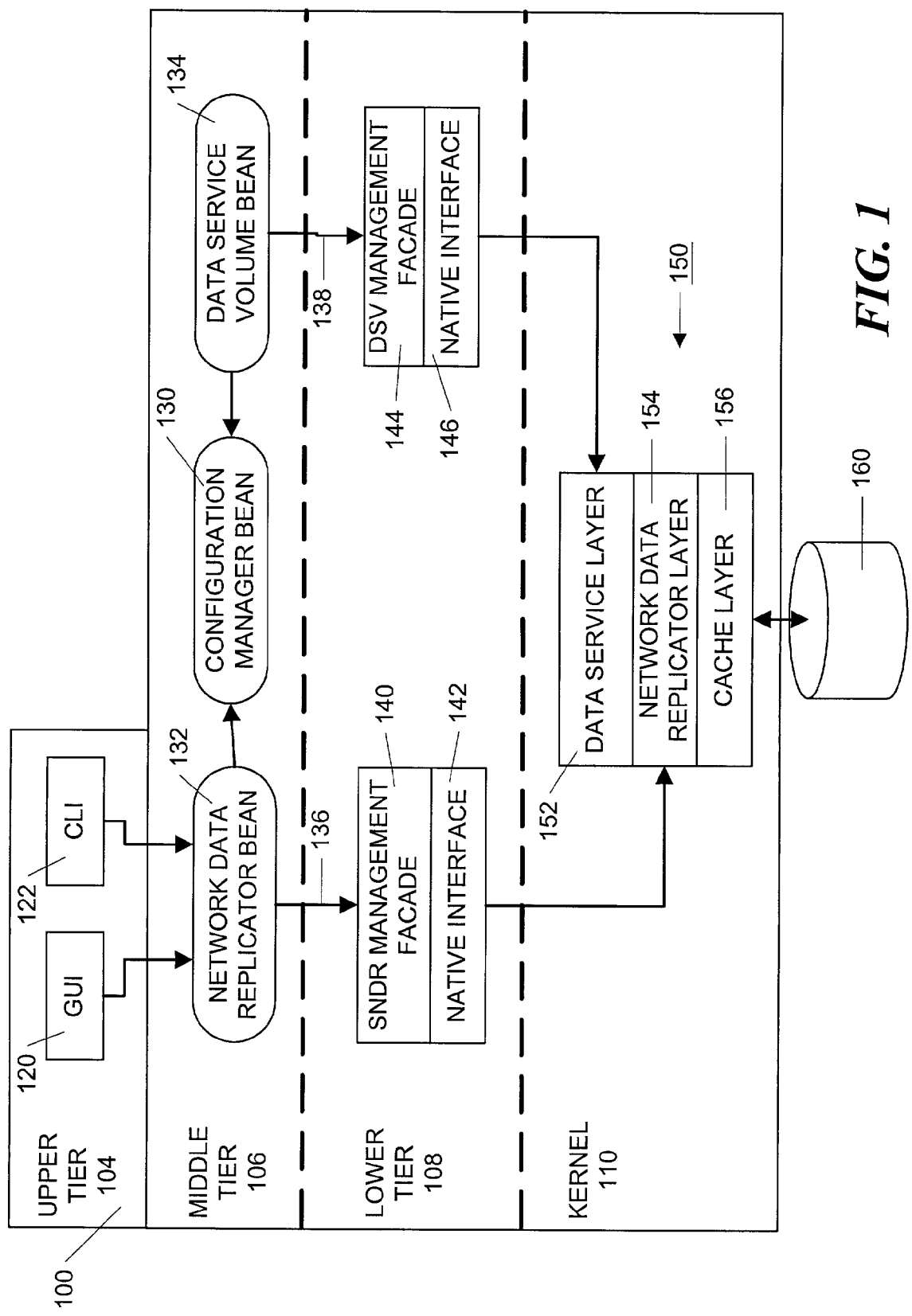
FIG. 1 is a block schematic diagram of a host computer system showing the three-tiered data service management system incorporating the configuration management arrangement of the present invention.

FIG. 1 shows a host system 100 that illustrates the contents of the three tiers running in the memory of a single host. The inventive data service system comprises three layers or tiers: an upper tier 104, a middle tier 106 and a lower tier 108. The upper tier 104 is a presentation level that can be implemented with either a graphical user interface (GUI) 120 or a command line interface (CLI) 122. A manager interacts with this level, via the GUI 120 or CLI 122, in order to create, configure and manage a data services system. The GUI 120 and the CLI 122, communicate with a federated bean that actually controls a particular data service. For example, in FIG. 1, the GUI 120 and the CLI 122 communicate with a bean 132 running in the host 100 where the GUI 120 and CLI 122 are running as indicated in FIG. 1. Bean 132 implements a network data replication data service.

The middle tier 106 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. Dynamic services are provided by the federated Java beans of the middle tier. Dynamic services require a hosting entity called a "station", which is a mechanism to allow many services to run within a single Java Virtual Machine. Every management domain contains one or more general-purpose shared stations.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at http://www.jiro.com, which manual is incorporated by reference in its entirety. The Jiro™ lookup service is implemented by means of the Jini™ lookup service described above.

The configuration management system constructed in accordance with the principles of the present invention is implemented by a federated bean called a configuration manager (CM) bean 130. The data services themselves are implemented by other federated beans running in host 100. These other beans include an SNDR bean 132 and a data services volume (DSV) bean 134. SNDR bean 132 implements a network data replication service and DSV bean 134 locates, configures and manages volumes used by the SNDR bean. Other beans may implement other data services, including a data imaging service a configuration service, a notification service and a caching service. These other beans and services are not shown in FIG. 1 in order to simplify the figure. Whenever changes are made in the data replication configuration of host 100, both the SNDR bean 132 and the data services bean 134 can inform the configuration manager bean 130 of the change in configuration information. SNDR bean 132 also retrieves configuration information from configuration manager bean 130 under appropriate situations. Configuration manager bean 130 maintains a persistent view of the configuration of the data replication on host 100. In this manner, if the host is interrupted during a data replication operation, it can be restored to the proper state when the operation is resumed.

The data services are managed by means of stacked layers between the host file system (not shown) and a resource 160. For example, in order to manage a network data replication system, data replication bean 132 communicates with a data replication layer 154 in the layered stack 150, via a data replication management facade 144 and a native interface 146. The data replication capability is actually implemented in the kernel layer 110 shown running in host 100 in FIG. 1. In particular, access by the host 100 to a resource 160, which can be a data storage component, is provided by a layered stack 150 comprising a data service volume layer 152, a network data replication layer 154 and a cache layer 156 and may also include other layers (not shown in FIG. 1). Application programs running in host 100 and the host file system access resource 160 though the layered stack 150 and layers 152–156 cooperate to implement the various data services. For example, the data service volume layer 152 places itself between device drivers in the normal data path and shunts I/O information through the other data service layers 154 and 156.

The data services layers would generally by implemented in platform-specific code, for example, in C routines, that expose application programmer interfaces (APIs) that can be accessed only from the host in which the layer is installed. In order to provide for remote management capability in accordance with the principles of the invention, the data replication layer 154 and the data service volume layer 152 are controlled by software running on the lower tier 108 of the data services system. The lower tier includes native interfaces 142 and 146 that convert the APIs exported by the layers 154 and 152 into a platform-independent language, such as Java™.

The native interfaces 142, 146 are, in turn, controlled by management facades 140 and 144 that provide the required remote management capability. In particular, the management facades 140, 144 provide a means by which the respective layers 154 and 152 can be accessed and managed as Jiro™ services. The management facades are essentially object-oriented models of the kernel-resident layers 154 and 152 and provide a collection of APIs to manage their associated layers.

Figure 2:
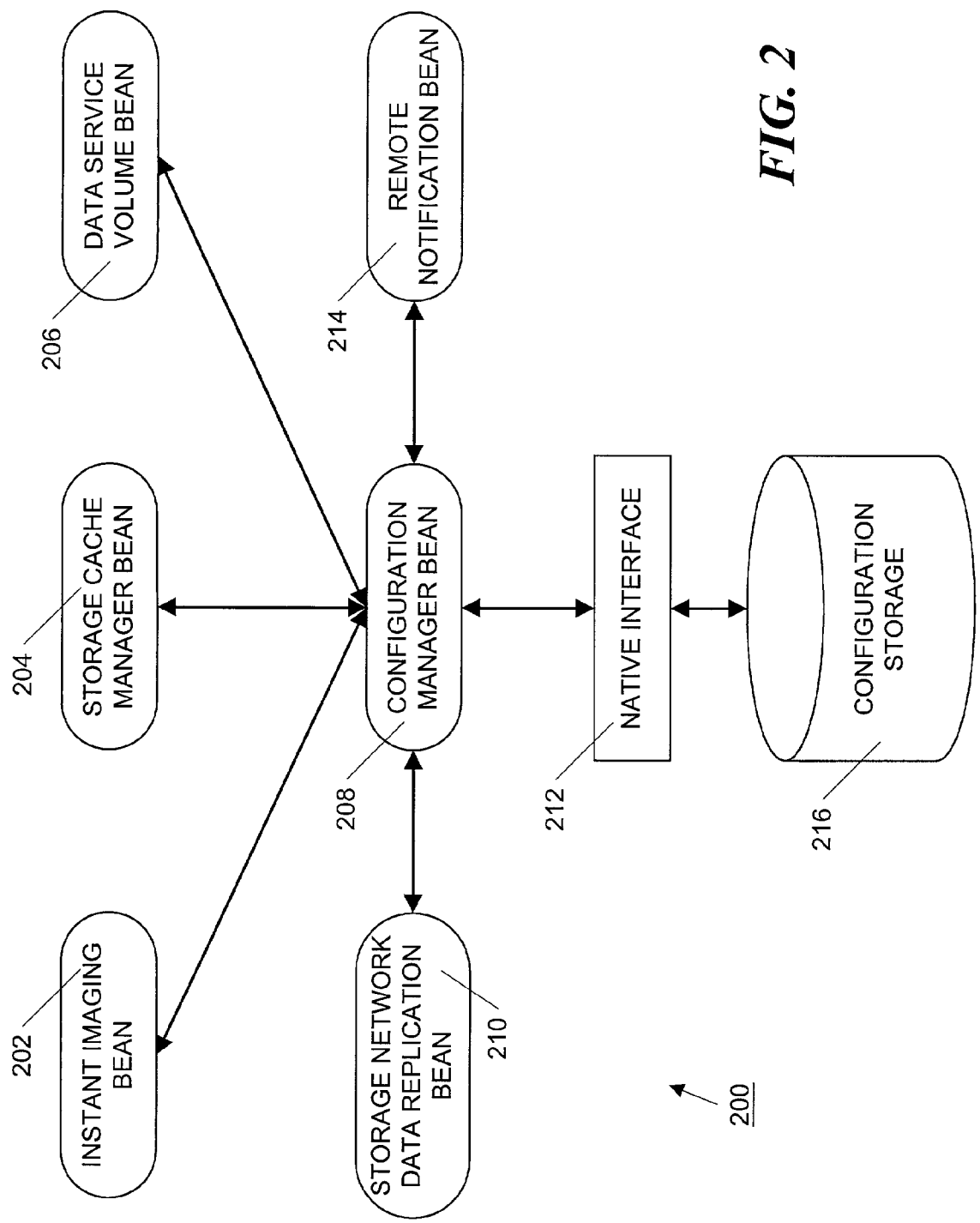
FIG. 2 is block schematic diagrams illustrating how data services represented by federated beans communicate with the configuration manager bean of the present invention.

In accordance with the principles of the invention, the CM bean 130 is provided in the middle tier 106 of each host in the system and is responsible for storing and retrieving configuration information required by the management services and the data services. Each of the management services and data services has its own unique set of information that must be persistently stored. FIG. 2 illustrates a host computer system 200 with a plurality of data services and a CM bean 208 running therein. As shown in FIG. 2, the CM bean 208 can interact with several different data services.

The data services are represented in FIG. 2 by the federated beans that manage them and include a Storage Network Data Replicator (SNDR) bean 210, an Instant Image (II) bean 202, a Data Services Volume (DSV) bean 206 (that manages local Storage Volumes (SV) and exported SCSI Target Emulation volumes (STE)), a Storage Cache Manager (SCM) bean 204 and a Remote Notification (RN) bean 214. The CM bean 208 will provide an interface to each service with which it interacts. In addition, a command line interface is provided to allow a manager to specify resource groups for which the CM bean 208 is responsible when the CM bean is operating in a clustered environment.

Each of the federated beans representing a data service interacts with the CM bean 208 by calling methods in the appropriate interface. In order to call these methods, the federated bean representing a data service obtains a proxy (an identifying handle) to the CM bean either by using the Jiro™ lookup service or by using another lookup service such as a lookup service implemented with another federated bean. Once the proxy has been obtained, it can be used to directly call the CM bean interface methods. In a similar manner, management systems that use a graphic user interface (GUI) or a command line interface (CLI) can also obtain a proxy to the CM bean so that the interfaces can call the appropriate methods.

The CM bean 208 has two modes of operation so that it can work in both clustered and non-clustered environments. In order to operate in both environments, CM bean 208 can use a native interface 212 which, in turn, uses a native C library called the "libcfg" library to read and write directly into a storage device file containing the configuration information. The libcfg library is discussed below and defines a set of application programming interfaces (APIs) which enable storing and retrieving information in a storage device 216 thereby enabling the bean 208 to work in both a clustered and a non-clustered environment. In addition, since the CM bean reads and writes directly to the file, the data services can access the information during a boot up without waiting for the conventional file system to begin operation.

Figure 3:
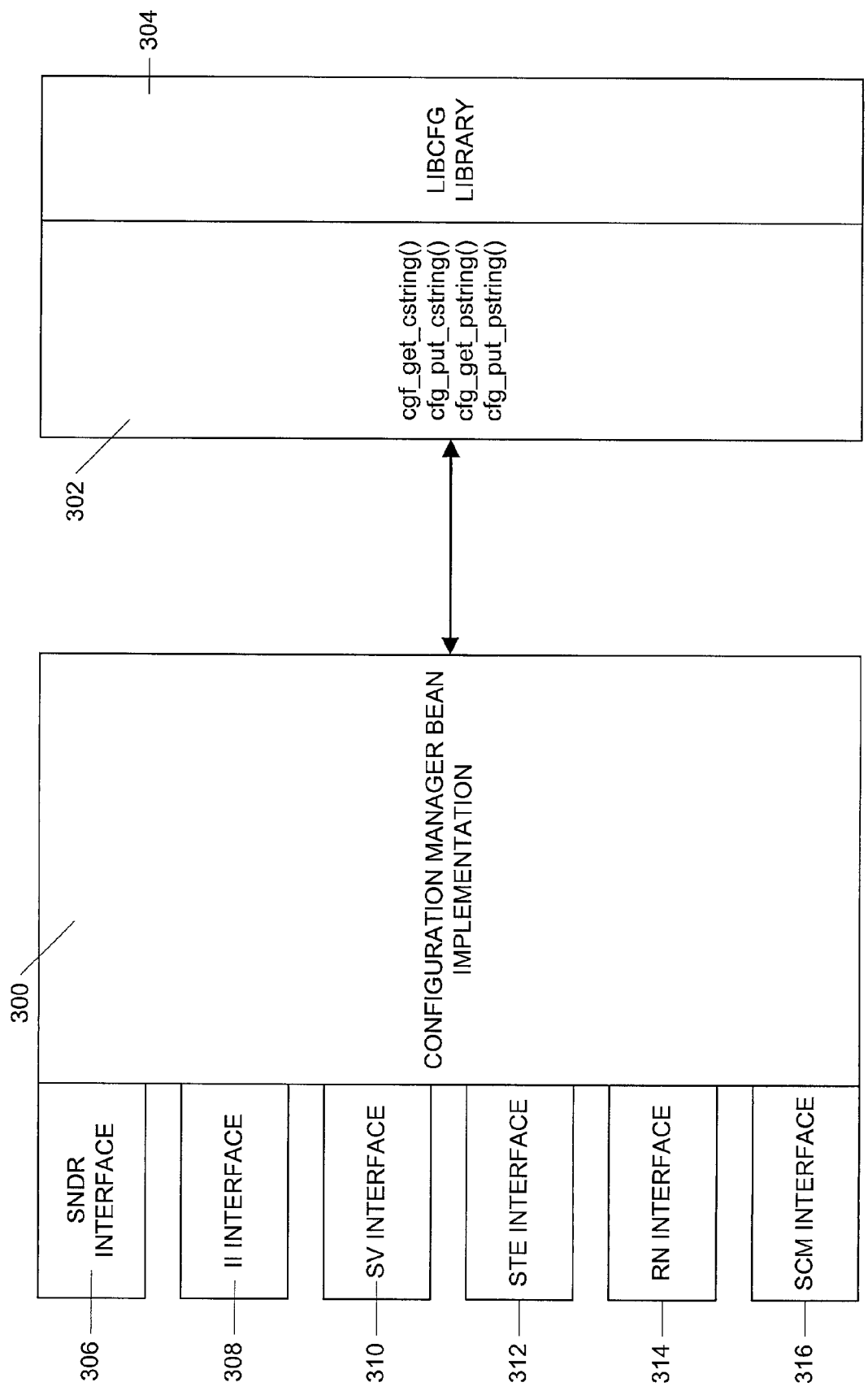
FIG. 3 is a block schematic diagram illustrating the interfaces used by the configuration manager bean.

Each of the management services and data services has a unique set of information that must be stored. Accordingly, the CM bean exports a set of interfaces, where one interface in the set is used by each of the services. FIG. 3 illustrates the interfaces used by the CM bean implementation 300 to interact with the various data services. Each interface has a method that stores and retrieves configuration information. The method takes as parameters a service name to identify the service and a plurality of fields that contain the information to be stored or retrieved. In an SNDR system, a secondary copy or "mirror" of information located in a primary volume at a primary host is maintained at a secondary host. When changes are made to the primary volume, updates are also made to the secondary volume so that the primary data and the secondary data remain "synchronized." The changes that are made are recorded in bitmap volumes associated with the primary and the secondary volumes. Together, the primary volume, the secondary volume and bitmap volume are called a volume set. Volume sets can also be grouped together so that various operations can be performed on the group with a single command. The SNDR interface 306 uses "sndr" as the service name. In addition, the SNDR federated bean uses an additional "sndr_temp" service name. For both services, the fields are named as follows:

| phost | Primary host |
| primary | Primary volume name |
| pbitmap | Primary bitmap volume name |
| shost | Secondary host |
| secondary | Secondary volume name |
| sbitmap | Secondary bitmap volume name |
| mode | SNDR-specific Information |
| type | SNDR-specific Information |
| group | Group to which this volume set belongs |
| cnode | The resource group to which this volume set belongs |
| options | SNDR-specific Information |

In a similar manner, in a point-in-time, instant image or data imaging system, data in a master volume is copied to a shadow volume so that a "snapshot" of the data is made at a given point in time. A complete copy may be made all at once and the resulting shadow volume is called independent. Alternatively, the copy can be made as read and write operations are performed in which case the shadow volume is called dependent. A bitmap volume can also be used to track changes between the master and shadow volumes. As with the SNDR system, the master, shadow and bitmap volumes together are called a volume set and volume sets may be grouped in order to simplify management of volume sets. In addition, an overflow volume may be assigned to a volume set if the shadow volume is smaller than the master volume and may fill. The Instant Image interface 308 will use "ii" as the service name. In addition, the II federated bean may need to store II group information, and, if so can use "ii_group" as a service name.

For the "ii" service, the fields are as follows:

| master | Master volume name |
| shadow | Shadow volume name |
| bitmap | Bitmap volume name |
| mode | Dependant or Independent set |
| overflow | Associated overflow volume |
| cnode | The resource group to which this set belongs |
| options | II-specific Information |

For the "ii_group" service, the fields are as follows:

| shadow | The shadow volume name |
| group | The name of the group |

Two interfaces are used with the data service volume bean because the bean offers two volume service types. The first is a storage volume (SV) data service interface 310 that provides data redirection if I/O data through other data services and is used for local volumes. The second type is called a SCSI Target Emulation (STE) data service that allows any backend storage to be exported for use on another host through a fiber channel. The SV data service will use "sv" as the service name. The fields are as follows:

| vol | Pathname of the volume |
| mode | Volume mode |

The STE data service interface 312 requires three different service names: "ste_tm", for associating ports with drivers, "ste_vd" for associating volumes with ports, and "ste_ph" for defining phantom headers and tails. For the "ste_tm" service, the fields are as follows:

| port | ID number of the port |
| driver | target mode driver (sftm, ifptm or fcptm) |
| device | path to the port |
| id | loop ID for the port |

For the "ste_vd" service, the fields are as follows:

| | |
|---|---|
| num | ID of the vdisk |
| path | Path name of the volume |
| port | Port number to export the volume to |
| lun | Logical unit number to use |
| state | STE-specific Information |
| options | STE-specific Information |

For the "ste_ph" service, the fields are as follows:

| | |
|---|---|
| device | STE-specific Information |
| path | Path name of the volume |
| start | Starting cylinder |
| size | Number of cylinders |

The remote notification service provides notifications to remote managers of significant events in the data service management system, generally via e-mail. The Remote Notification (RN) bean that manages the service is the only bean that is not based on a data service. The RN bean interface 314 requires an "rn" service name, with the following fields:

| | |
|---|---|
| category | The category to which the notification belongs. |
| email | The email address of the user to be notified |
| username | The user's real name |
| event | The event which triggers a notification |

The SCM data service performs conventional data caching operations and needs to store only three pieces of information. The SCM interface 316 requires an "scm" service name and uses the following fields:

| | |
|---|---|
| memsize | Amount of memory to use |
| rpolicy | Current read policy |
| wpolicy | Current write policy |

The CM bean implementation 300 persists the information which is presented for storage by the data services by means of the libcfg library routines 304 which are called via an interface 302. The libcfg interface 302 performs simple parsing of configuration data and persistent data as well as handling of shared configuration information between multiple hosts. All data is assumed to be ASCII string data.

The configuration information exists either in a shared file on a distributed file system or in a shared disk partition and may be accessed by multiple logical hosts within a cluster. Thus, care must be taken when accessing the configuration to properly open and lock the configuration when updating.

In one embodiment, the design of the libcfg library breaks the configuration information into two major sections. The first section is a shared data service and management service section that contains configuration information that will be used by the data service command line interfaces and GUIs, boot programs and management service applications. The second section contains persistent data that can be used by other programs.

In an illustrative embodiment, the basic design is called a key-driven parser in which "keys" are used to identify entries in the configuration and persistent information sections. The possible keys are contained in a parser configuration file that will exist on disk and in memory once the configuration file is loaded. The configuration file may be updated to add or extend the keys that are used to access or place data into appropriate information sections. A checksum is used to track changes with each new parser configuration. Each of the basic parser configuration file entries is a rule having the following form:

service_name.name1.name2.name3 . . .

The rule consists of a service name followed by one or more field names. Field Names (name1, name2, name3, etc.) are positionally ordered, separated by a "." character and are used for retrieving or storing values. All values are ASCII strings. If a value is not present for a given field, then a placeholder will be inserted.

For example, an illustrative parser configuration file for the data services mentioned above might include the following rules:

sndr.phost.primary.pbitmap.shost-
   .secondary.sbitmap.mode.type.group.cnode.options
sndr_temp.phost.primary.pbitmap-
   .shost.secondary.sbitmap.mode.type.group.cnode.options
ii.master.shadow.bitmap.mode.overflow.cnode.options
ii_group.shadow.group
sv.vol.mode
ste_tm.port.driver.device.id
ste_vd.num.path.port.lun.state.options
ste_ph.device.path.start.size
rn.category.email.username.event
scm.memsize,rpolicy.wpolicy Each parser configuration rule defines what fields may be specified, the positional order of fields and how they may be retrieved or written into a specified information section. For example, the parser configuration rule:

ii.master.shadow.bitmap defines a service name "ii" followed by three fields "master", "shadow" and "bitmap". Data in the persistent information section will be stored in sets, with a set corresponding to each II data service. Each set is accessed by a key with the overall form of the configuration rule. Thus, each key starts with the service name and, for a given key, a special tag specification can be used to define which data set to access. For example, this special tag specification can be the second field of the key. As an illustration, to access a first set of II data as specified in the above parser configuration rule, the following key could be used:

ii.set1

This key would return all of the specified field value strings defined in the parser configuration rule for II data set 1. If only the master volume information is needed, then the following key can be used:

ii.set1.master

To access the master volume entry in the next data set, the following key would be used:

ii.set2.master

The persistent data section can use the same service names as the configuration section. For example such a key might have the following form:

sndr.phost.primary.pbitmap

An illustrative key could be "sndr.set1.primary" which returns the primary volume name for the first SNDR data set.

Sometimes a configuration field may need to contain "freeform" data. In this case the freeform data can be stored and retrieved as "option" data that has the form:

tag1=val1; tag2=val2; . . .

Any specified parser configuration field may contain options data, but generally, fields named "options" contain this data. For example, the sndr.set1.options field could contain the option values "row=1; col=2".

The libcfg library can support systems that are configured as clustered systems and as standalone systems. As set forth above, many configuration rules include a field with a field name of "cnode" which can be used to indicate with which cluster disk device group or resource this entry will participate in the configuration. The cnode field on a standalone system will be NULL and in a clustered system, the value in this field can be entered by a special resource interface. If the cnode field has a NULL value, then all storage and retrieval routines will operate on all configuration entries. If the cnode field has a non-NULL value, then only those entries whose "cnode" field values match the cnode value in the key will be retrieved. All storage operations will automatically include the specified node value in the "cnode" data field value.

The actual methods for storing and retrieving data in both the configuration section and the persistent data section are shown in the interface section 302 of FIG. 3. These methods include the cfg_get_cstring(file, key, value) method that is used to retrieve into the variable "value" information from the configuration section "file" as identified by "key." For example, a call to method cfg_get_cstring(file, ii.set1.master, value) would return in the variable "value" the master volume for set 1. Similarly, the cfg_put_cstring (file, key, value) stores information in the variable "value", into the configuration section "file" in the entry identified by "key."

The methods also include the cfg_get_pstring(file, key, value) method that is used to retrieve into the variable "value" information from the persistent data section "file" as identified by "key." For example, a call to method cfg_get_pstring(file, ii.set2.master, value) would return in the variable "value" the master volume for set 2. Similarly, the cfg_put_pstring(file, key, value) stores information in the variable "value", into the persistent data section "file" in the entry identified by "key." Other conventional methods that allow new keys to be entered into the parser configuration file and that lock and unlock the configuration file have been omitted to simplify FIG. 3.

Figure 4:
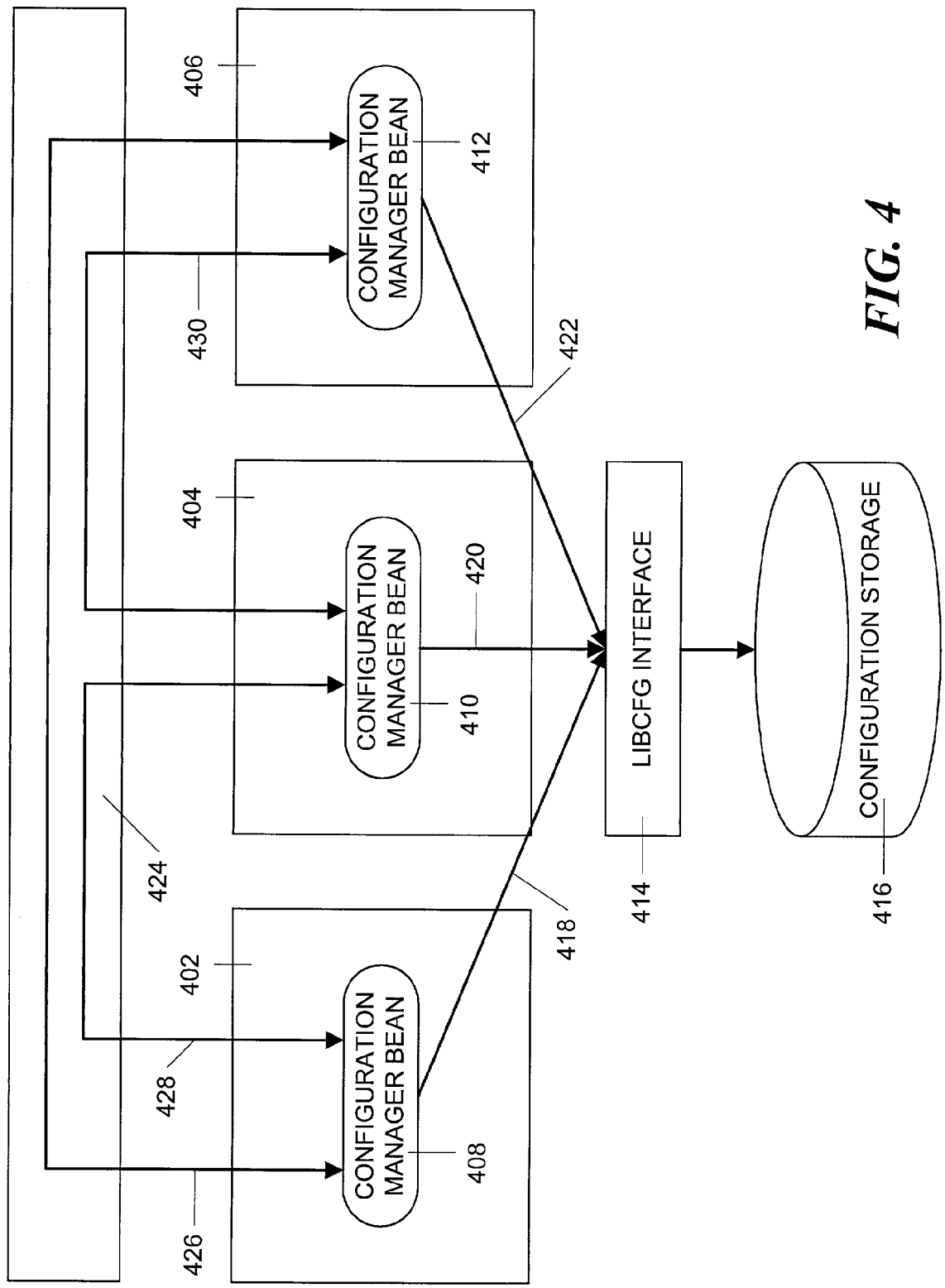
FIG. 4 is block schematic diagram illustrating how configuration manager beans in a clustered environment interact to implement an arbitration protocol to prevent two beans from simultaneously writing to a single storage area.

In a standalone or non-clustered environment, the CM bean operates in a first mode in which it reads and writes to the configuration file using the libcfg interface in an unrestricted manner, since it is the only bean that will write to the file. However, In a clustered configuration 400 such as that shown in FIG. 4, each host 402, 404 and 406 has a CM bean (408, 410 and 412, respectively) running in it. Each CM bean can write to the configuration file 416, via the libcfg interface 414, as indicated schematically by arrows 418, 420 and 422. In such a clustered environment, the CM beans operate in a different mode. In this clustered mode, any CM bean can read from the file 416, but only one CM bean can write to the configuration file 416 at any given time, since all of the hosts 402, 404 and 406 in the cluster share the same configuration file 416.

In order to prevent two CM beans from attempting to simultaneously write to file 416, while operating in clustered mode, each CM bean, 402, 404, 406, must implement an arbitration protocol to decide which bean will perform the writing. Once arbitration is complete, only one CM bean will be considered to be in "active" mode and can write to the configuration file 416. The remaining beans will be in "hot standby" mode. If the "active" bean fails (or its host fails), the arbitration protocol will be used to choose which CM bean in hot standby mode assumes the "active" mode. When a CM bean is in the hot standby mode, it still receives configuration information from the other data service beans running on its host. However, a CM bean in hot standby mode does not write to the configuration file. Instead, it sends the configuration information to the active CM bean, which performs the write.

Each CM bean follows an arbitration protocol that is designed to determine which CM bean will be responsible for writing to the configuration file. The arbitration protocol is used during three scenarios. The first scenario is a full restart. For example, a full restart can occur when power is restored after a failure, or a reboot is done after kernels are upgraded. During a full restart scenario, all hosts begin operation at, or near, the same time and a decision must be made as to which CM bean will be in "active" mode. In this case, it is not important which host has the active CM bean, but it is important that only one CM bean becomes active.

The second scenario is a single node restart. A single node restart occurs when a single host with a CM bean is added into an existing and already-running cluster. This addition might be made because additional capacity is needed or because a broken machine has been repaired. In this case, the arbitration protocol allows the CM bean in the added host to determine whether another CM bean is already in active mode.

The last scenario is a failure of the CM bean that is in active mode. The CM bean in active mode could fail for several reasons. When this occurs, one of the other CM beans on "hot standby" must take over active role. The arbitration protocol discussed below handles all three of the aforementioned scenarios.

When a CM bean begins operation, it has no way of knowing whether it is part of a full restart scenario or a single node restart. However, the protocol is designed to handle both cases at once. In order to decide which CM bean assumes active mode, each CM bean is assigned a unique ID number. In one embodiment this unique ID number can be the network address of the host or node on which the CM bean resides. In accordance with the protocol, the ID numbers are compared to determine which bean will assume active mode. For example, the CM bean running in the node with the lowest network address could assume the active mode. In the arbitration process, the CM beans 408, 410 and 412 exchange information over a network 424 as schematically illustrated by arrows 426, 428 and 430 using for example, the existing Jiro™ event service. If this network is the Internet, then IP addresses would be used. By comparing IP addresses, the CM beans can determine which one has the lowest number and thereby choose the active bean.

Figure 5A:
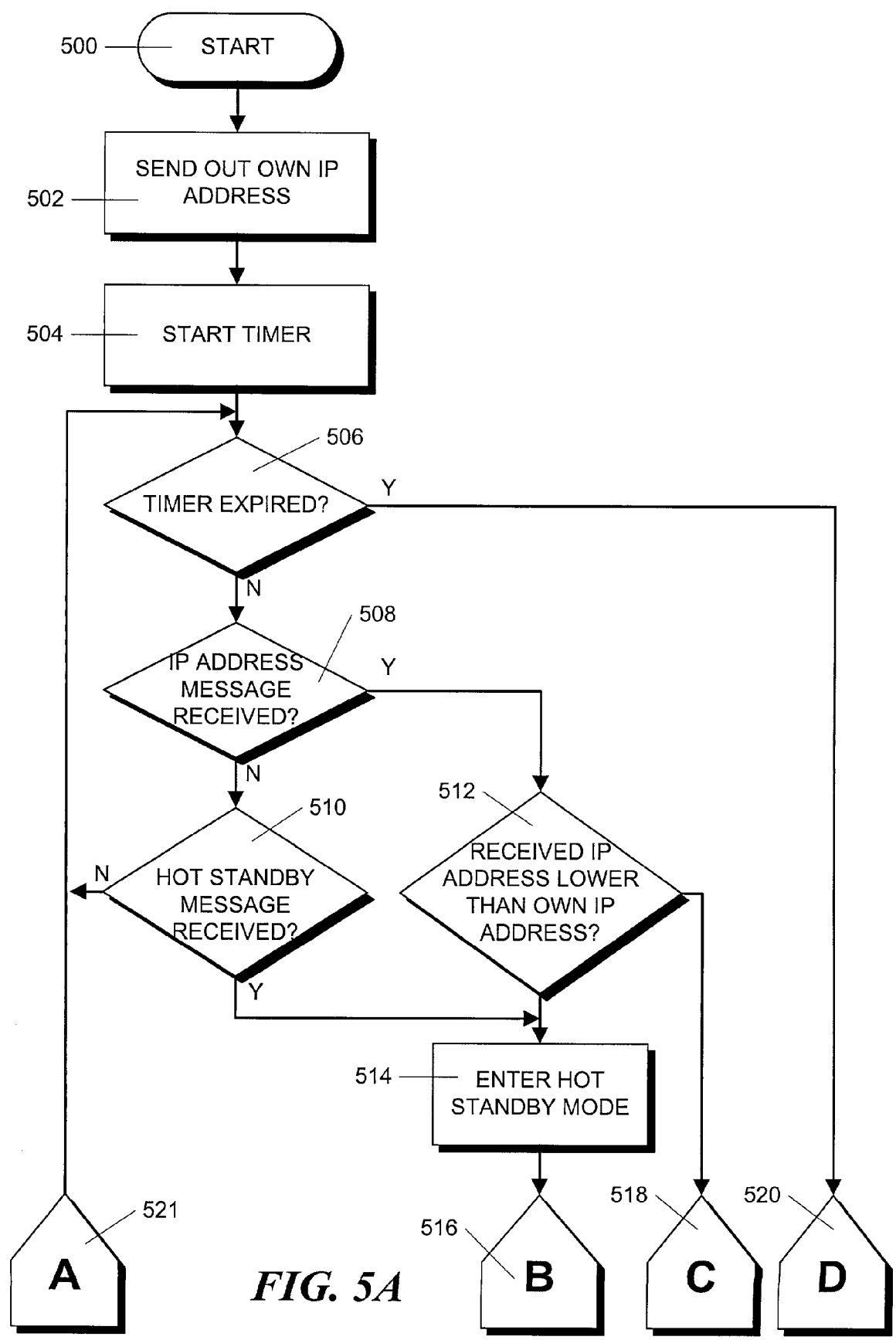
FIGS. 5A and 5B, when placed together, form a flowchart showing illustrative steps in an arbitration process used when a configuration manager bean initially starts or enters a running cluster.
Figure 5B:
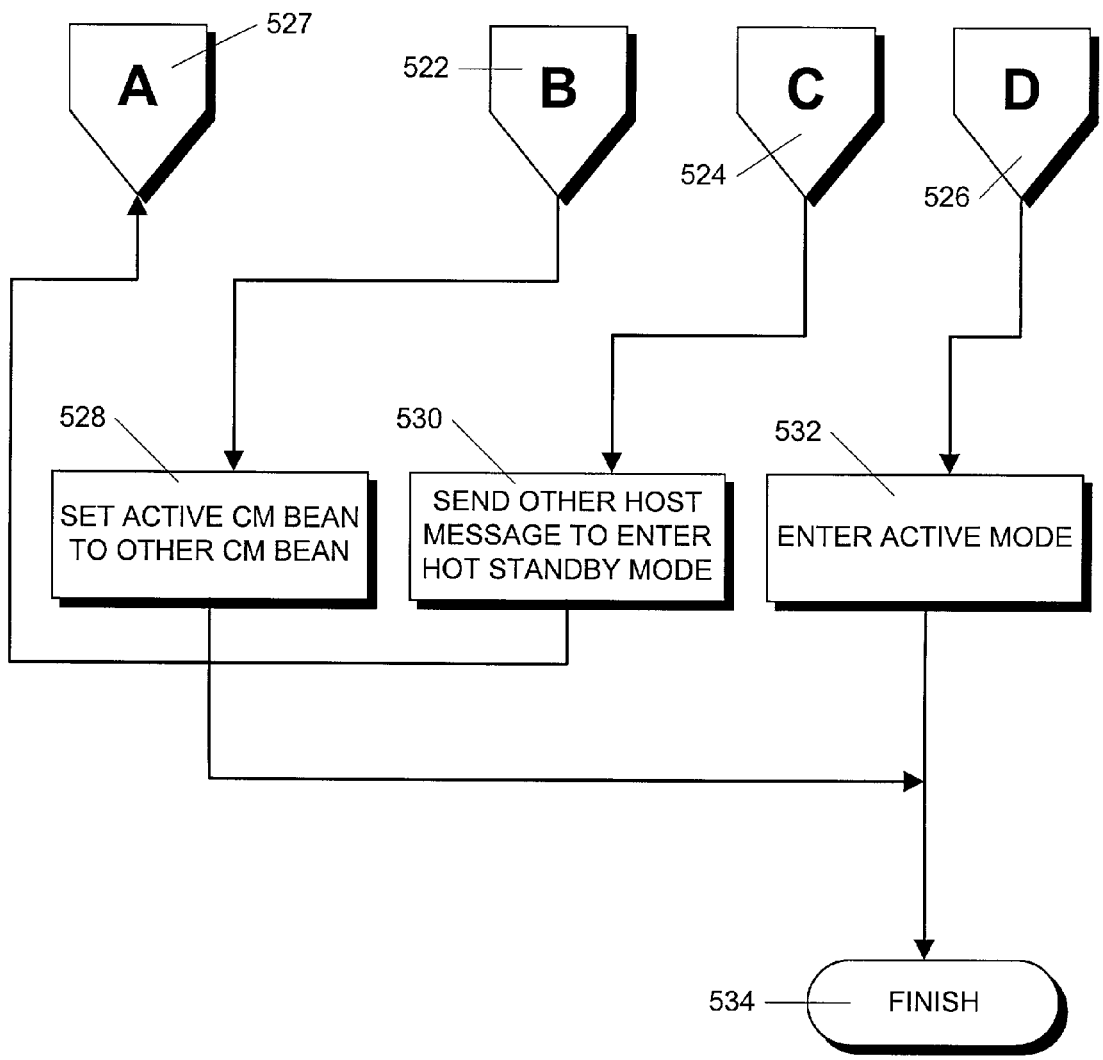

The steps a CM bean follows when starting operation in a system where many nodes are starting at or near the same time are shown in FIGS. 5A and 5B and illustrated in the following pseudocode.

```
my_ip = getIPaddress( );
EventService.post(my_ip);
start_1_minute_timer( );
while ( timer_hasn't_expired( ) ) {
   other_host = getMessage( );
   switch ( message_type ) {
   case ip_address:
      if (other host ip is lower than my_ip) {
         this_host -> "hot standby" mode
         active_CM = other_host
         return
```

```
        } else {
            other_host.send(go to "hot standby"mode);
        }
        break;
    case hot_standby:
        this_host -> "hot standby"
        active_CM = other_host
        return
    }
}
active_CM = this_host
return
```

The arbitration process begins in step 500 and proceeds to step 502 where a CM bean sends out its the IP address of its own host to all other hosts. The bean then starts a timer that operates for a predetermined interval of time, for example, one minute. If the bean receives no response from another host within the time interval and the timer expires as determined in step 506, then the process proceeds, via off-page connectors 520 and 526, to step 532 where the bean assumes it is the active CM bean and enters active mode. The process then finishes in step 534.

If the bean does receive a response message from another host before the timer expires, as determined in step 506, it can be one of two things: another IP address (which means that another CM bean started and is performing the same start-up protocol), or a command to go to "hot standby" (which means that either another CM bean is already in active mode or that the other CM bean has a lower IP address). In particular, if an IP address is received, as indicated in step 508, the process proceeds to step 512.

In step 512, the arbitration protocol determines whether the received IP address is lower than the IP address of the CM bean host. If so, the CM bean cannot enter active mode. Instead, in step 514, the CM bean enters hot standby mode, and proceeds, via off-page connectors 516 and 522 to step 528 where the beam stores the received IP address as the address of the active mode CM bean. The process then finishes in step 534.

Alternatively, if in step 512, it is determined that the CM bean host IP address is lower than the received IP address, then the process proceeds, via off-page connectors 518 and 524 to step 530 where the CM bean sends a message to the CM bean in the other host telling that CM bean to enter hot standby mode. The process then returns via off-page connectors 527 and 521, to step 506 to determine whether the timer has expired and to await possible other messages.

When a single CM bean is added to an already running system, it follows the above protocol as shown in FIGS. 5A and 5B. In particular, it sends its own IP address to the Jiro™ event service as indicated in step 502. The CM bean in active mode listens for events such as this and responds by sending back a message telling the newly started CM bean to go into "hot standby" mode. Thus, the newly added CM bean will follow process steps 510, 514 and 528.

Figure 6A:
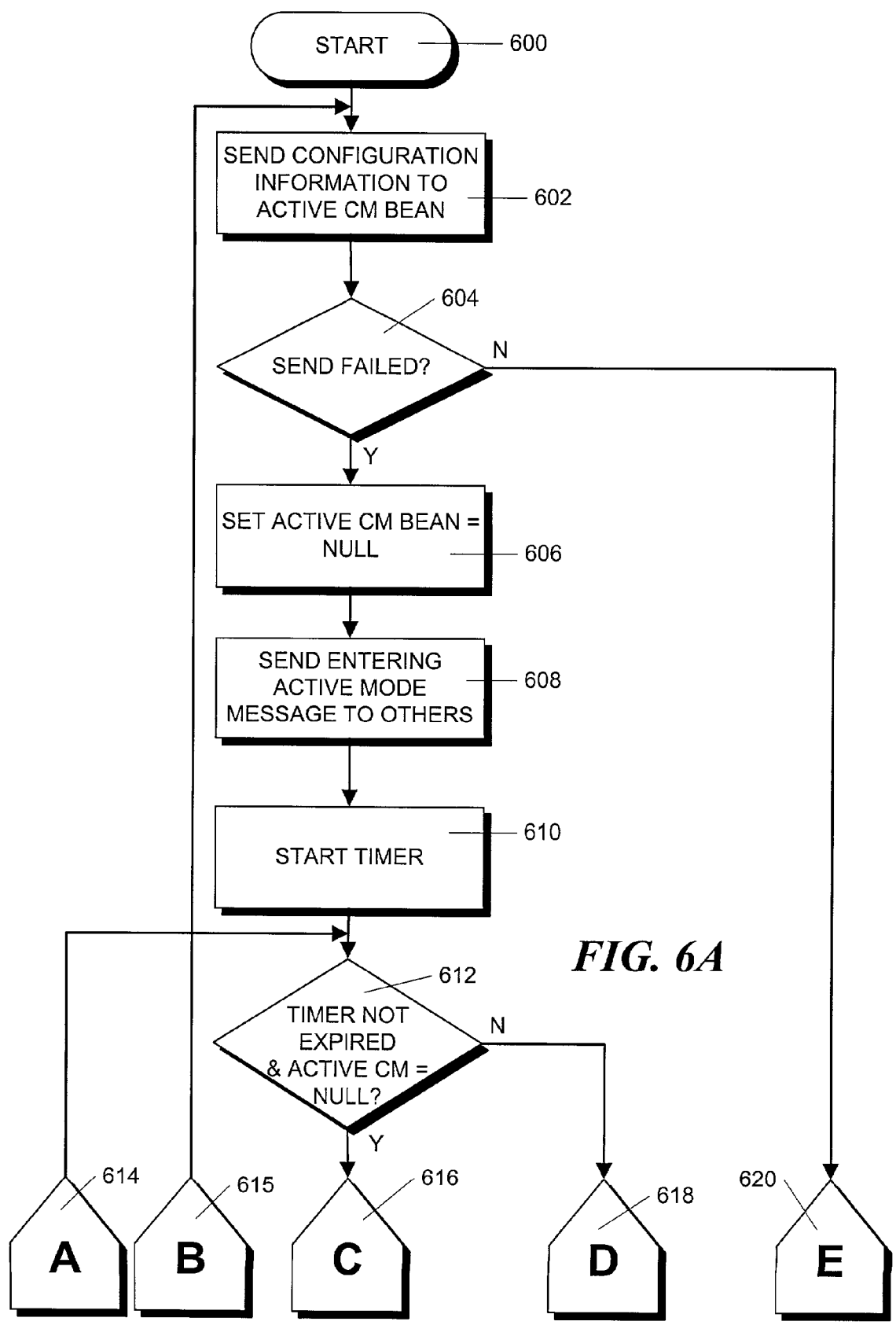
FIGS. 6A and 6B, when placed together, form a flowchart showing illustrative steps in an arbitration process used when an active configuration manager bean may have failed.
Figure 6B:
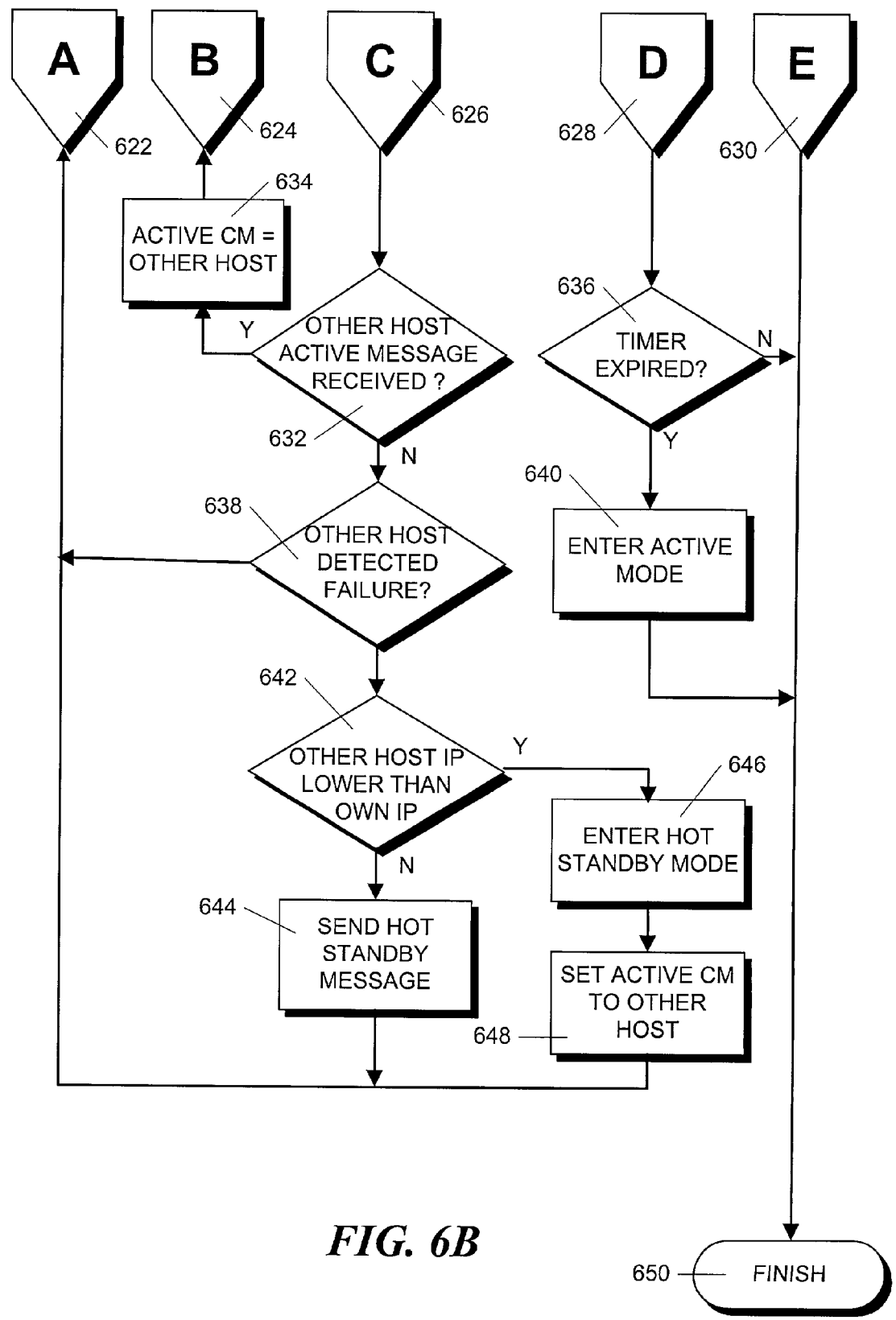

The final case that the arbitration protocol must cover is the case where the CM bean in active mode fails. This failure is detected when a CM bean in "hot standby" mode is not able to send messages to the active CM bean. This protocol is shown in FIG. 6, in is also set forth below in pseudocode.

```
active_CM.send(new_config);
while (send failed) {
    active_CM = null;
    eventService.post (this_host is now Active );
    start_10_second_timer( );
    while (active_CM == null && timer_hasn't_expired( ) ) {
        other_host = getMessage ( );
        switch (message_type) {
            case other_host_is_active:
                active_CM = other_host
                break
            case other_host_detected_failure:
                if (other_host IP is lower than this_host IP) {
                    this_host -> "hot standby"
                    active_CM = other_host
                    break;
                } else {
                    other_host.send(go to "hot standby");
                }
                break;
        }
    }
    if (timer expired( )) {
        active CM = this host;
    }
    active-CM.send(new_config);
}
```

The process begins in step 600 and proceeds to step 602 where a hot standby CM bean attempts to send new configuration information to the active CM bean. In step 604, a check is made to determine if the send operation failed. If not, the process proceeds, via off-page connectors 620 and 630, to finish in step 650. However, in this case, we are assuming the active CM bean may have failed and, consequently, the send operation will fail. Thus, the process proceeds to step 606 where the active CM bean is cleared (set to NULL). Then, in step 608, the hot standby CM bean sends out a message to all other CM beans telling them that it is entering active mode.

Then, in step 610, the hot standby CM bean starts a timer for a predetermined period of time, for example, ten seconds. In step 612, a determination is made whether the timer has expired and the active CM bean identification is still cleared. If the timer has not expired, the process proceeds, via off-page connectors 616 and 626, to step 632 where the hot standby bean listens for responses to its message.

The hot standby bean may receive two types of responses. The first response type would be generated by the real active CM bean and is detected in step 632. Such a response would mean that the original configuration message send operation failed for reasons other than that the active CM bean had failed. In this case, the process proceeds to step 634 where the host IP address of the current active CM bean is stored in the active CM bean identification area. The process then proceeds, via off-page connectors 624 and 615, back to step 602 where the hot standby CM bean tries to re-send the configuration information and the steps described above are repeated.

The second type of message that a hot standby CM bean could receive in response to its message would be generated by another CM bean in hot standby mode. Such a scenario could occur if that other CM bean also tried to send information to the active CM bean and its send operation also failed. This message is detected in step 638 and includes the host IP address of the other CM bean. In step 642, the received IP address is compared to the IP address of the hot standby CM bean to determine if the received address is lower. If it is, then in step 646 the bean enters the hot standby mode and, in step 648, the host IP address of the other CM bean is stored in the active CM bean identification area. The process then proceeds, via off-page connectors 622 and 614 back to step 612.

Alternatively, if, in step 642, the hot standby CM bean determines that its host IP address is lower than the received IP address, it sends a message to the other CM bean causing the other CM bean to enter the hot standby mode. The process then proceeds, via off-page connectors 622 and 614 back to step 612. This part of the protocol only lasts for a predetermined time interval as determined by the timer (for example, 10 seconds) or until another CM bean has successfully asserted the active mode.

In particular, when the timer has expired or another CM bean asserts that it is active, the process proceeds from step 612, via off-page connectors 618 and 628, to step 636 where a check is made to determine if the timer has expired. If the timer has expired, the process proceeds to step 640 where the hot standby CM bean enters the active mode and the process finishes in step 650. Alternatively, if the timer has not expired because another CM bean has assumed active mode, then the process finishes in step 650.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing configuration information in a distributed computer system with a data storage, a file system for storing information in the data storage and a host computer on which a data service system is running, the method comprising:
   (a) running, in the host computer, a configuration manager federated bean having an interface with a method that accepts configuration information from the data service system;
   (b) controlling the data service system to locate the configuration manager federated bean, provide configuration information and call the method; and
   (c) the method using file management methods in a file management library to directly store the configuration information in the data storage thereby bypassing the file system.

2. The method of claim 1 wherein the data service system has a lookup service and step (b) comprises using the lookup service to locate the configuration manager federated bean.

3. The method of claim 2 wherein the data service system comprises a plurality of data service federated beans, each of which provides a data service.

4. The method of claim 3 wherein each of the data service federated beans uses the lookup service to locate the configuration manager federated bean, provide configuration information and call the method.

5. Apparatus for managing configuration information in a distributed computer system with a data storage, a file system for storing information in the data storage and a host computer on which a data service system is running, the apparatus comprising:
   a configuration manager federated bean that runs in the host computer and has an interface with a method that accepts configuration information from the data service system;
   a mechanism in the data service system that locates the configuration manager federated bean, provides configuration information and calls the method; and
   a file management library containing file management methods that are used by the method to directly store the configuration information in the data storage thereby bypassing the file system.

6. The apparatus of claim 5 wherein the mechanism in the data service system comprises a lookup service that is used to locate the configuration manager federated bean.

7. The apparatus of claim 6 wherein the data service system comprises a plurality of data service federated beans, each of which provides a data service.

8. The apparatus of claim 7 wherein each of the data service federated beans uses the lookup service to locate the configuration manager federated bean, provide configuration information and call the method.

9. A method for managing configuration information in a distributed computer system with a data storage and a plurality of host computers, each of which has a data service running thereon, the method comprising:
   (a) running, in each host computer, a data service federated bean that uses the configuration information to manage the data service running on that host computer;
   (b) running, in each host computer, a configuration manager federated bean having an interface with a method that accepts configuration information from the data service federated bean running on that host computer; and
   (c) using the configuration manager federated bean to store the configuration; wherein the distributed computer system has a file system for storing information in the data storage and the configuration manager federated bean comprises a direct interface with the data storage to allow the configuration manager federated bean to store information in the data storage and bypass the file system.

10. The method of claim 9 wherein the plurality of host computers are connected by a network and the data service federated bean and the configuration manager federated bean communicate via the network.

11. Apparatus for managing configuration information in a distributed computer system with a data storage and a plurality of host computers, each of which has a data service running thereon, the apparatus comprising:
- a data service federated bean that runs in each host computer and uses the configuration information to manage the data service running on that host computer;
- a configuration manager federated bean that runs in each host computer and has an interface with a method that accepts configuration information from the data service federated bean running on that host computer; and
- means in the configuration manager federated bean for storing the; wherein the distributed computer system has a file system for storing information in the data storage and the configuration manager federated bean comprises a direct interface with the data storage to allow the configuration manager federated bean to store information in the data storage and bypass the file system.

12. The apparatus of claim 11 wherein the plurality of host computers are connected by a network and apparatus comprises means for connecting the data service federated bean and the configuration manager federated bean via the network to allow the data service federated bean and the configuration manager federated bean to communicate.

13. A computer program product for managing configuration information in a distributed computer system with a data storage, a file system for storing information in the data storage and a host computer on which a data service system is running, the computer program product comprising a computer usable medium having computer readable program code thereon, including:
- configuration manager federated bean program code that runs in the host computer and has an interface with a method that accepts configuration information from the data service system;
- means operable in the data service system for locating the configuration manager federated bean, providing configuration information and calling the method; and
- file management program code to directly store the configuration information in the data storage thereby bypassing the file system.

14. A computer program product for managing configuration information in a distributed computer system with a data storage and a plurality of host computers, each of which has a data service running thereon, the computer program product comprising a computer usable medium having computer readable program code thereon, including:
- data service federated bean program code that runs in each host computer and that uses the configuration information to manage the data service running on that host computer;
- configuration manager federated bean program code that runs in each host computer and that has an interface with a method that accepts configuration information from the data service federated bean running on that host computer; and
- program code that uses the configuration manager federated bean to; wherein the distributed computer system has a file system for storing information in the data storage and the configuration manager federated bean comprises a direct interface with the data storage to allow the configuration manager federated bean to store information in the data storage and bypass the file system.

* * * * *

UNITED STATES PATENT AND TRADEMARK OFFICE
CERTIFICATE OF CORRECTION

| | | |
|---|---|---|
| PATENT NO. | : 7,159,015 B2 | Page 1 of 1 |
| APPLICATION NO. | : 10/012150 | |
| DATED | : January 2, 2007 | |
| INVENTOR(S) | : Chhandomay Mandal et al. | |

It is certified that error appears in the above-identified patent and that said Letters Patent is hereby corrected as shown below:

In column 14, at line 64, after "configuration", insert --information in the data storage--.

In column 15, at line 20, after "the", insert --configuration information in the data storage--.

In column 16, at line 29, after "to", insert --store the configuration information in the data storage--.

Signed and Sealed this

Tenth Day of April, 2007

JON W. DUDAS
*Director of the United States Patent and Trademark Office*